(12) United States Patent
Gukeisen

(10) Patent No.: US 9,540,113 B2
(45) Date of Patent: Jan. 10, 2017

(54) DE-COUPLE GEARED TURBO-FAN ENGINE AND AIRCRAFT

(71) Applicant: United Technologies Corporation, Hartford, CT (US)

(72) Inventor: Robert L. Gukeisen, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 464 days.

(21) Appl. No.: 14/188,989

(22) Filed: Feb. 25, 2014

(65) Prior Publication Data

US 2014/0252161 A1  Sep. 11, 2014

Related U.S. Application Data

(60) Provisional application No. 61/775,875, filed on Mar. 11, 2013.

(51) Int. Cl.
| | | |
|---|---|---|
| *B64D 27/14* | (2006.01) | |
| *F02C 7/36* | (2006.01) | |
| *F02K 1/52* | (2006.01) | |
| *F02K 1/60* | (2006.01) | |
| *F02K 1/70* | (2006.01) | |
| *F02K 1/78* | (2006.01) | |
| *F02K 3/068* | (2006.01) | |
| *F02C 3/10* | (2006.01) | |
| *F02C 3/107* | (2006.01) | |
| *B64D 35/02* | (2006.01) | |

(52) U.S. Cl.
CPC ............... *B64D 27/14* (2013.01); *B64D 35/02* (2013.01); *F02C 3/10* (2013.01); *F02C 3/107* (2013.01); *F02C 7/36* (2013.01); *F02K 1/52* (2013.01); *F02K 1/60* (2013.01); *F02K 1/70* (2013.01); *F02K 1/78* (2013.01); *F02K 3/068* (2013.01); *Y02T 50/671* (2013.01)

(58) Field of Classification Search
CPC .......... B64D 27/14; B64D 35/02; F02C 3/107; F02C 3/10; F02C 7/36; F02K 3/068
See application file for complete search history.

(56) References Cited

U.S. PATENT DOCUMENTS 3,194,516 A * 7/1965 Messerschmitt ....... B64D 27/20
244/74
3,212,733 A * 10/1965 Kutney ................. B64C 11/001
244/12.4

(Continued)

OTHER PUBLICATIONS

Moir, Ian and Allan Seabridge. Aircraft Systems: Mechanical, electrical, and avionics subsystems integration, Third Edition. John Wiley & Sons, Ltd. 2008. pp. 81-83.*

*Primary Examiner* — Brian M O'Hara
*Assistant Examiner* — Michael Kreiner
(74) *Attorney, Agent, or Firm* — Carlson, Gaskey & Olds, P.C.

(57) ABSTRACT

A turbofan engine includes a core engine section including a compressor section feeding air to a combustor to generate high speed exhaust gases that drive a turbine section all disposed about an engine axis, a geartrain driven by the core engine section, a fan section driven by the geartrain about a fan axis spaced apart from the engine axis, and an accessory gearbox driven by the geartrain and mounted apart from the core engine section and the fan section.

11 Claims, 5 Drawing Sheets

(56) References Cited

U.S. PATENT DOCUMENTS

| | | | |
|---|---|---|---|
| 3,251,567 A * | 5/1966 | Messerschmitt | B64D 27/16 244/15 |
| 3,302,907 A * | 2/1967 | Wilde | B64C 29/0033 244/53 B |
| 4,116,405 A | 9/1978 | Bacchi et al. | |
| 6,543,718 B2 | 4/2003 | Provost | |
| 7,107,755 B2 | 9/2006 | El Hamel et al. | |
| 7,540,450 B2 | 6/2009 | Brand et al. | |
| 7,752,834 B2 * | 7/2010 | Addis | B64D 27/10 244/60 |
| 8,015,796 B2 | 9/2011 | Babu et al. | |
| 8,113,464 B2 | 2/2012 | Cazals | |
| 8,128,023 B2 | 3/2012 | Cazals | |
| 8,324,746 B2 * | 12/2012 | Bradbrook | F02C 3/113 290/1 A |
| 2004/0025493 A1 * | 2/2004 | Wojciechowski | F02K 3/06 60/224 |
| 2006/0011780 A1 * | 1/2006 | Brand | B64D 35/04 244/60 |
| 2006/0185346 A1 * | 8/2006 | Rolt | F02K 3/06 60/224 |
| 2008/0099632 A1 * | 5/2008 | Addis | B64D 27/14 244/53 B |
| 2009/0097967 A1 * | 4/2009 | Smith | F01D 17/162 415/145 |
| 2009/0193789 A1 * | 8/2009 | Pero | F02K 1/70 60/226.2 |
| 2012/0199699 A1 * | 8/2012 | Isaac | B64C 29/0033 244/7 R |
| 2014/0360206 A1 * | 12/2014 | Bradbrook | F02C 7/32 60/797 |
| 2015/0121896 A1 * | 5/2015 | Suciu | F02K 1/605 60/796 |
| 2015/0226117 A1 * | 8/2015 | Suciu | F02C 3/06 60/726 |
| 2015/0240745 A1 * | 8/2015 | Lord | F02K 1/40 60/770 |
| 2015/0247455 A1 * | 9/2015 | Sheridan | F02C 7/36 60/772 |
| 2015/0247456 A1 * | 9/2015 | Suciu | F02C 3/06 60/791 |
| 2015/0274306 A1 * | 10/2015 | Sheridan | B64D 27/10 60/772 |
| 2015/0291285 A1 * | 10/2015 | Gallet | B64D 27/20 415/60 |

* cited by examiner

DE-COUPLE GEARED TURBO-FAN ENGINE AND AIRCRAFT

CROSS REFERENCE TO RELATED APPLICATION

This application claims priority to U.S. Provisional Application No. 61/775,875 filed on Mar. 11, 2013.

BACKGROUND

Commercial aircraft typically utilize a gas turbofan engine mounted under wing or in a tail structure. The gas turbine engine typically includes a fan section, and a core section including a compressor section, a combustor section and a turbine section all rotating about a common axis. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section drives air through a bypass passage to develop a majority of thrust produced by the engine. Larger fan diameters increase engine efficiencies. Increased diameters require correspondingly large cases and nacelle structures that are currently mounted under an aircraft wing. Accommodations such as longer landing gear, cantilevered engine mounting structures and/or complex wing structures required due to the larger fan sections increase weight and counteract the engine efficiency gains.

Accordingly, engine and aircraft manufactures continue to seek further improvements to aircraft design to take advantage of advances in engine performance including improvements to thermal, transfer and propulsive efficiencies.

SUMMARY

A turbofan engine according to an exemplary embodiment of this disclosure, among other possible things includes a core engine section including a compressor section feeding air to a combustor to generate high speed exhaust gases that drive a turbine section all disposed about an engine axis, a geartrain driven by the core engine section, a fan section driven by the geartrain about a fan axis spaced apart from the engine axis, and an accessory gearbox driven by the geartrain and mounted apart from the core engine section and the fan section.

In a further embodiment of the foregoing turbofan engine, includes an input shaft driven by the core engine section and a first output shaft driven by the geartrain for driving the fan section. The input shaft and first output shaft rotate about different axes.

In a further embodiment of any of the foregoing turbofan engines, the input shaft extends axially forward of the core engine section.

In a further embodiment of any of the foregoing turbofan engines, includes a second output shaft driven by the geartrain driving the accessory gearbox.

In a further embodiment of any of the foregoing turbofan engines, the fan axis is spaced horizontally apart from the engine axis.

In a further embodiment of any of the foregoing turbofan engines, the fan axis and the engine axis are substantially parallel.

In a further embodiment of any of the foregoing turbofan engines, the fan section includes a bypass ratio greater than about 10.

An aircraft propulsion system according to an exemplary embodiment of this disclosure, among other possible things includes a core engine section mounted within an aft portion of an aircraft fuselage. The core engine section includes a compressor section feeding air to a combustor to generate high speed exhaust gases that drive a turbine section all disposed about an engine axis. A geartrain is mounted within the aircraft fuselage and driven by the core engine section. A fan section is externally mounted to the aircraft fuselage and driven by the geartrain about a fan axis spaced apart from the engine axis. An accessory gearbox is supported within the aircraft fuselage and driven by the geartrain and mounted apart from the core engine section and the fan section.

In a further embodiment of the foregoing aircraft propulsion system, includes an inlet for supplying air to the core engine section mounted to the aircraft fuselage.

In a further embodiment of any of the foregoing aircraft propulsion systems, includes a fan case surrounding the fan section. The fan case includes a first thrust reverser movable to a position directing thrust from the fan section in a direction to slow the aircraft.

In a further embodiment of any of the foregoing aircraft propulsion systems, includes an exhaust nozzle disposed about the engine axis. The exhaust nozzle includes a second thrust reverser for directing exhaust gases from the core engine section in a direction to slow the aircraft.

In a further embodiment of any of the foregoing aircraft propulsion systems, includes an input shaft driven by the core engine section for driving the geartrain, a first output shaft from the geartrain driving the fan section, and a second output shaft from the geartrain driving the accessory gearbox.

In a further embodiment of any of the foregoing aircraft propulsion systems, the fan axis is parallel to the engine axis.

In a further embodiment of any of the foregoing aircraft propulsion systems, the core engine section includes a first core engine section and a second core engine section mounted side-by-side within the aft portion of the aircraft fuselage and the fan section includes first and second fan sections driven by a corresponding one of the first and second core engine sections.

In a further embodiment of any of the foregoing aircraft propulsion systems, geartrain includes first and second geartrains and the accessory gearbox includes first and second accessory gearboxes driven by a corresponding one of the first and second geartrains.

An aircraft system according to an exemplary embodiment of this disclosure, among other possible things includes an elongated fuselage. A wing structure extends from opposing sides of the fuselage. A vertical stabilizer includes a horizontal stabilizer surface mounted to an upper portion of the vertical stabilizer. A core engine section is mounted within an aft portion of an aircraft fuselage. The core section includes a compressor section feeding air to a combustor to generate high speed exhaust gases that drive a turbine section all disposed about an engine axis. A geartrain is mounted within the aircraft fuselage and driven by the core section. A fan section is externally mounted to the aircraft fuselage and driven by the geartrain about a fan axis spaced apart from the engine axis. An accessory gearbox is supported within the aircraft fuselage and driven by the geartrain and mounted apart from the core section and the fan section.

In a further embodiment of the foregoing aircraft system, the core section includes first and second core sections and the fan section includes first and second fan sections driven by corresponding ones of the first and second core engine sections.

In a further embodiment of any of the foregoing aircraft systems, includes an air inlet supplying air to each of the first and second core engine sections.

In a further embodiment of any of the foregoing aircraft systems, the fan section is mounted above the wing structure.

In a further embodiment of any of the foregoing aircraft systems, the fan section includes a bypass ratio greater than about 10.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
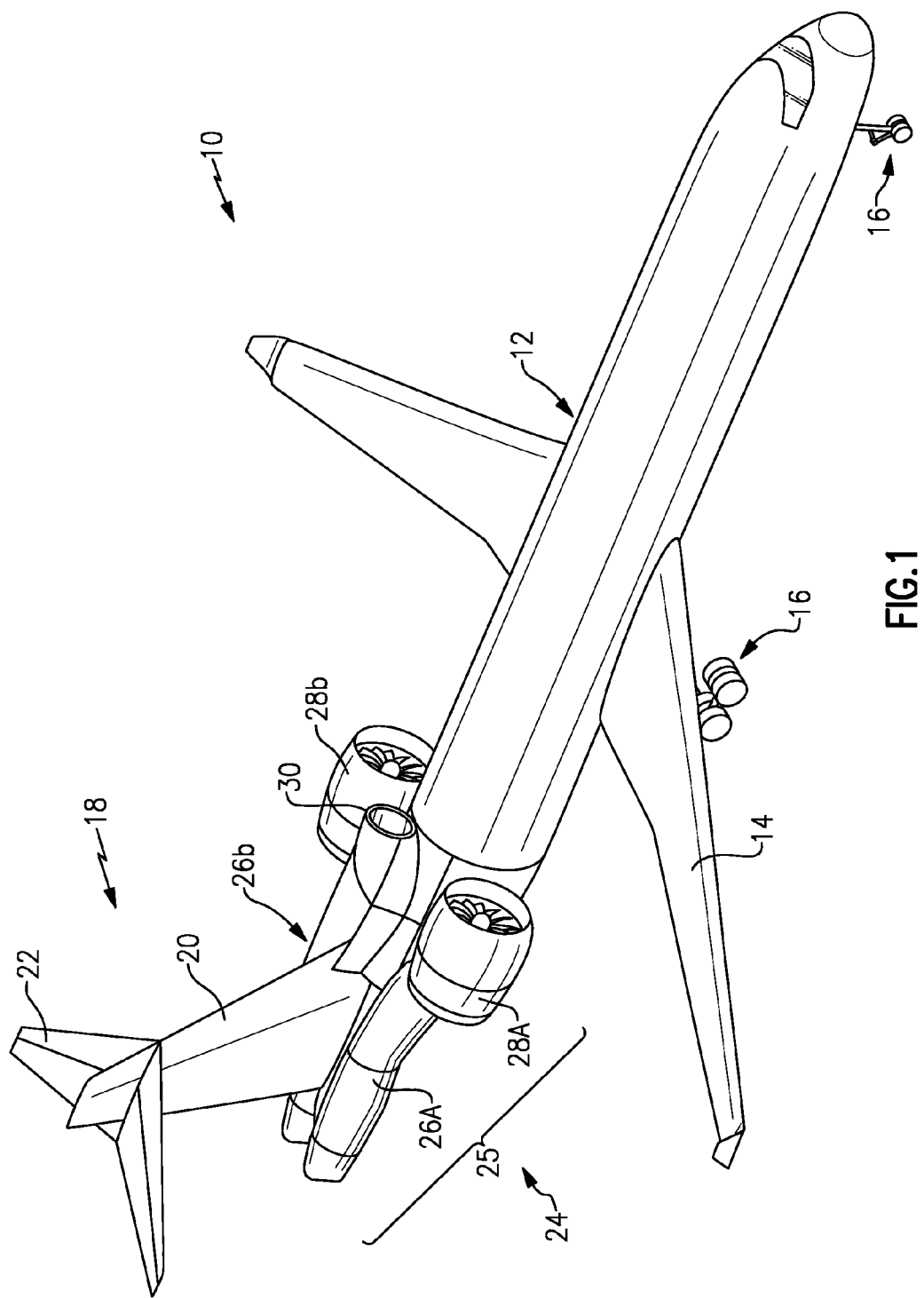
FIG. 1 is a schematic view of an example aircraft including ultra-high bypass turbofan engines.
Figure 2:
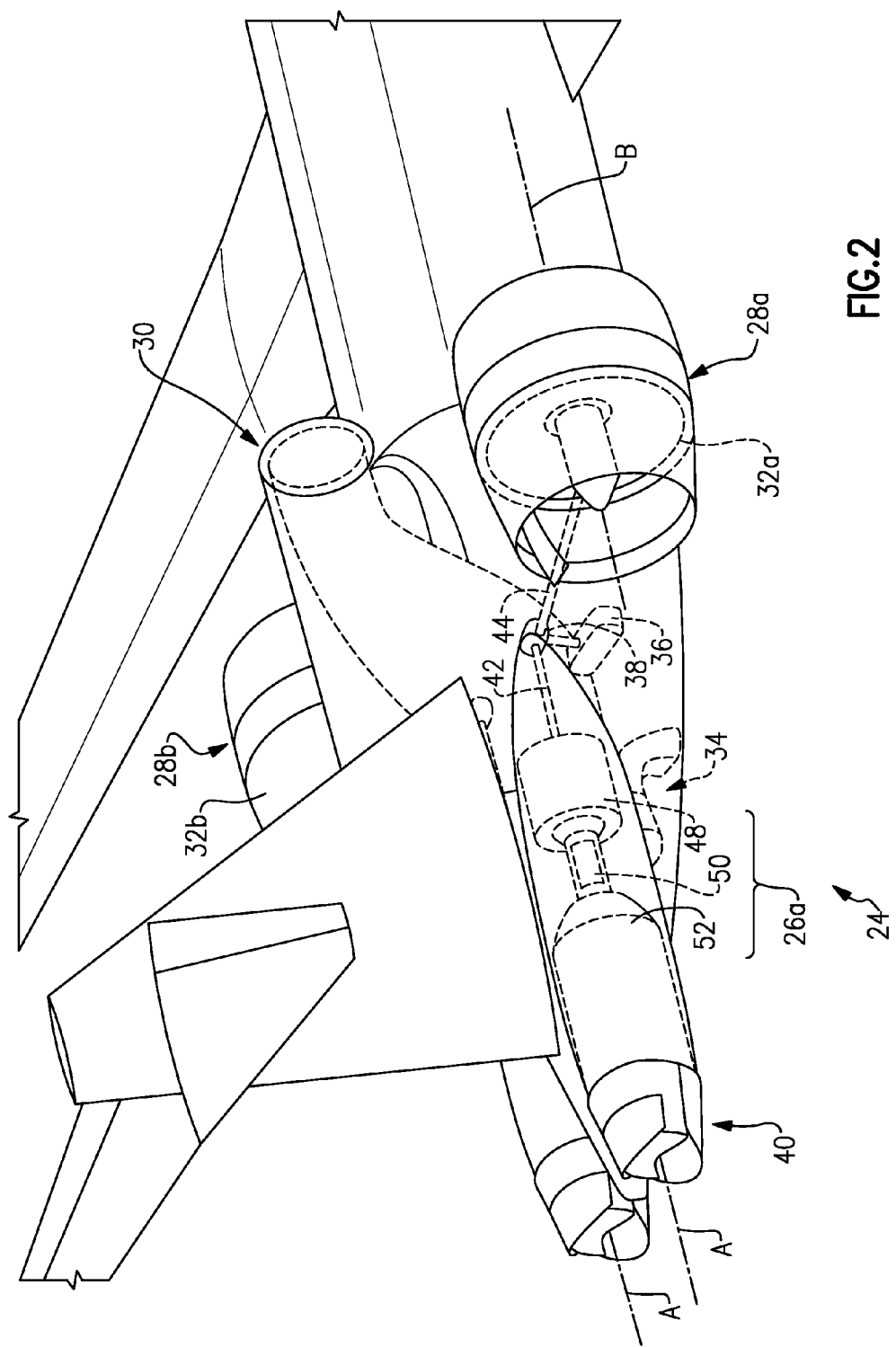
FIG. 2 is an aft perspective view of the example aircraft and propulsion system.

Referring to FIGS. 1 and 2, an example aircraft 10 is shown that includes wings 14 that extend from a fuselage 12. The aircraft 10 includes landing gear 16 are provided on each of the wings 14 and at a front of the fuselage 12. The example aircraft 10 includes a T-tail 18. The T-tail 18 includes a vertical stabilizer 20 and a horizontal stabilizer 22 disposed at an upper end of the vertical stabilizer 20.

The fuselage 12 includes an aft portion 24 that supports a propulsion system 25. The example propulsion system 25 includes core engine sections 26a, 26b that drive corresponding fan sections 28a and 28b. The core engine sections 26a and 26b are disposed about respective axes A that are spaced apart from respective axes B of the fan sections 28a and 28b. An inlet 30 defined within the fuselage 12 provides airflow to feed the core engine sections 26a and 26b.

Figure 3:
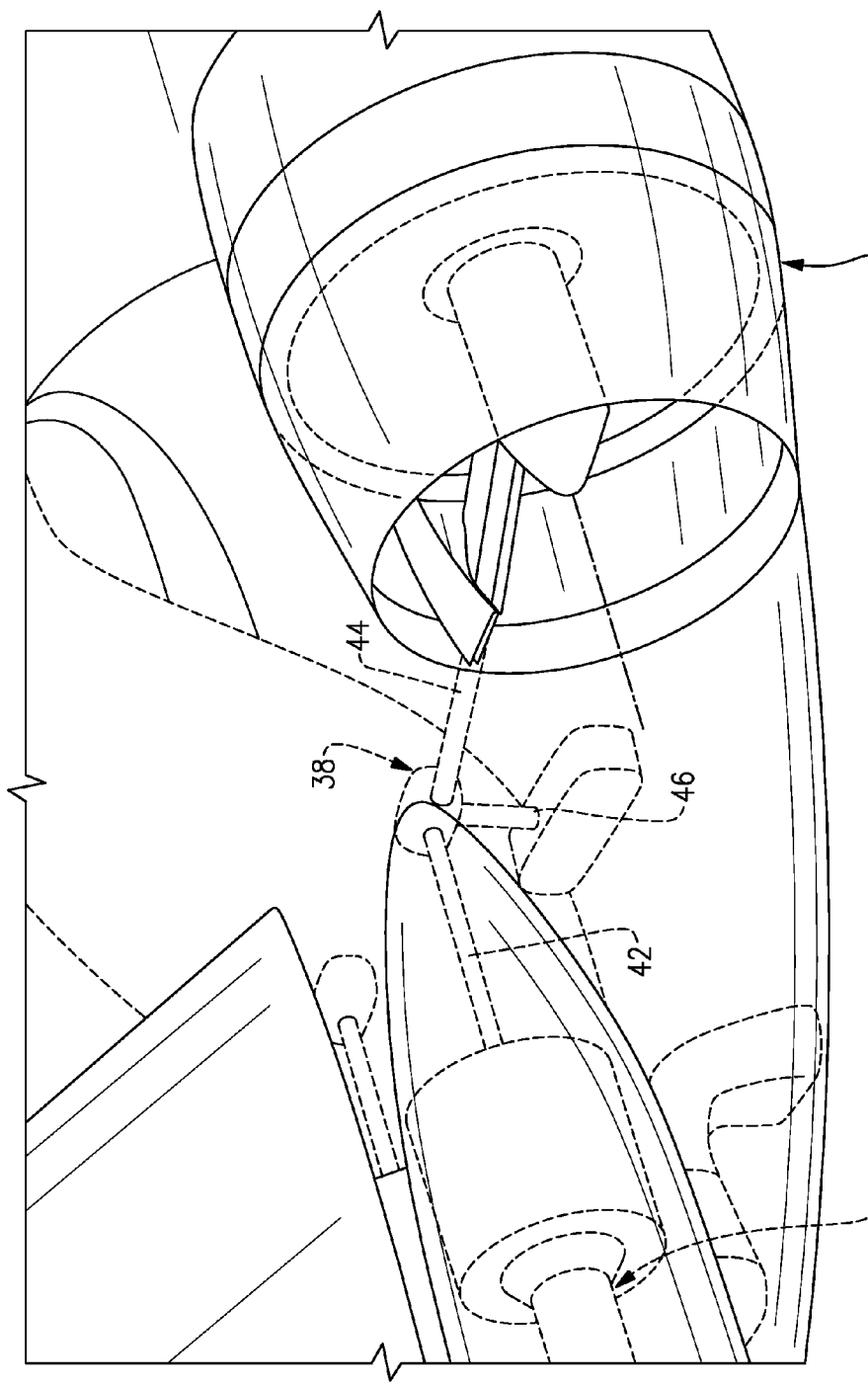
FIG. 3 is an enlarged view of a portion of the example propulsion system.

Referring to FIGS. 2 and 3 with continued reference to FIG. 1, the example propulsion system 25 includes two core engine sections 26a and 26b that are mounted side-by-side at the aft portion 24 of the fuselage 12. Each of the core engine sections 26a, 26b include a compressor section 48, a combustor section 50 and a turbine section 52 disposed about respective axes A. An auxiliary power unit 34 is also mounted in the aft portion 14 of the fuselage 12.

As appreciated each of the core engine sections 26a and 26b include similar structure for powering respective fan sections 28a and 28b. One of the example core engine sections 26a is described with the understanding that identical structure (not shown) is duplicated for the core engine section 26b.

The core engine section 26a drives an input shaft 42 that in turn drives a geartrain 38. The geartrain 38 includes a first output shaft 44 that drives the corresponding fan section 28a. The fan section 28a includes a plurality of fan blades disposed within corresponding fan cases 32a that rotate about the axis B. The axis B is spaced apart and parallel to the axis A of the core engine section 26a.

The geartrain 38 also includes a second output shaft 46 that drives an accessory gearbox 36. The accessory gearbox 36 drives systems required to support operation of the corresponding core engine 26a along with systems utilized for aircraft operation. Moreover, although the disclosed embodiment includes an accessory gearbox 36 for each core engine 26a, 26b, it is within the contemplation of this disclosure that a single accessory gearbox 36 could be utilized for both core engine sections 26a, 26b.

Figure 4:
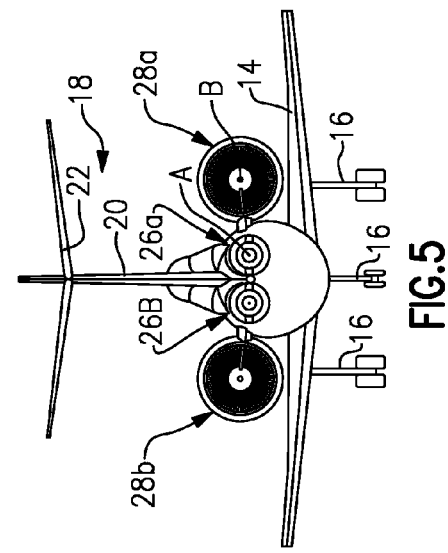
FIG. 4 is a side view of the aft portion of the aircraft including the example propulsion system.
Figure 5:
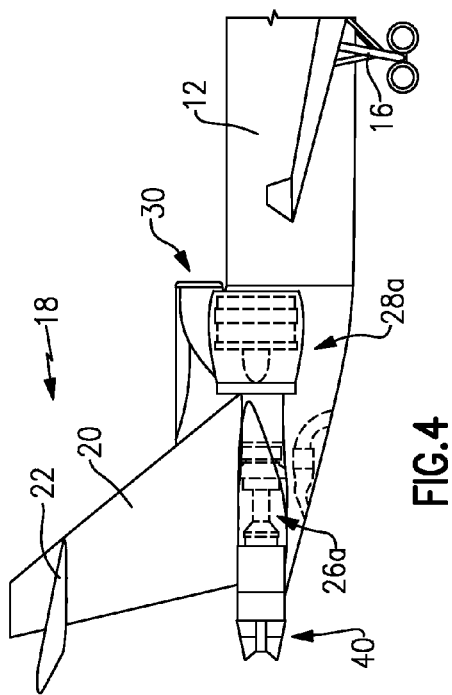
FIG. 5 is an aft view of the example propulsion system.
Figure 6:
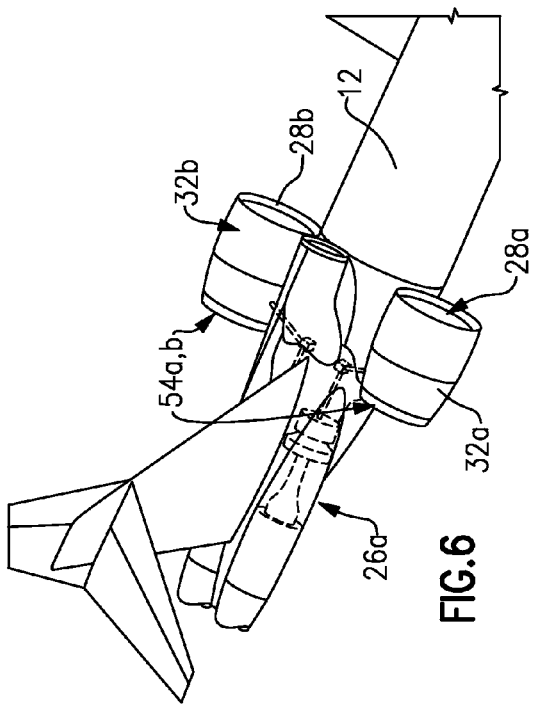
FIG. 6 is another perspective view of the example propulsion system.

Referring to FIGS. 4, 5 and 6, the example fan sections 28a and 28b are mounted to a side of the fuselage 12 and above the wings 14. Gas turbine engines that are mounted below the wing 14 are limited as to the size of the fan due to restrictions and minimum clearance requirements for the aircraft 10. Large fan sections that are mounted under the wing 14 require longer aircraft landing gear 16 that in turn add weight that can eliminate or reduce the effectiveness and efficiencies provided by the larger fan sections 28a and 28b.

In this example, the aircraft 10 includes the fan sections 28a and 28b that are mounted to the aft portion 24 of the fuselage 12 in a position above the wing 14 and therefore can provide ultra-high bypass ratios greater than about 10. Moreover, by separating the core engine sections 26a, 26b from the fan sections 28a, 28b, the mounting structures supporting the fan sections 28a and 28b can be lighter to further increase engine efficiency.

The T-tail section 18 includes the vertical stabilizer 20 and the horizontal stabilizer 22. The horizontal stabilizer 22 is mounted substantially on an upper tip of the vertical stabilizer 20 such that airflow over the control surfaces of the horizontal stabilizer 22 is not detrimentally affected by airflow output from the fan sections 28a and 28b.

Figure 7:
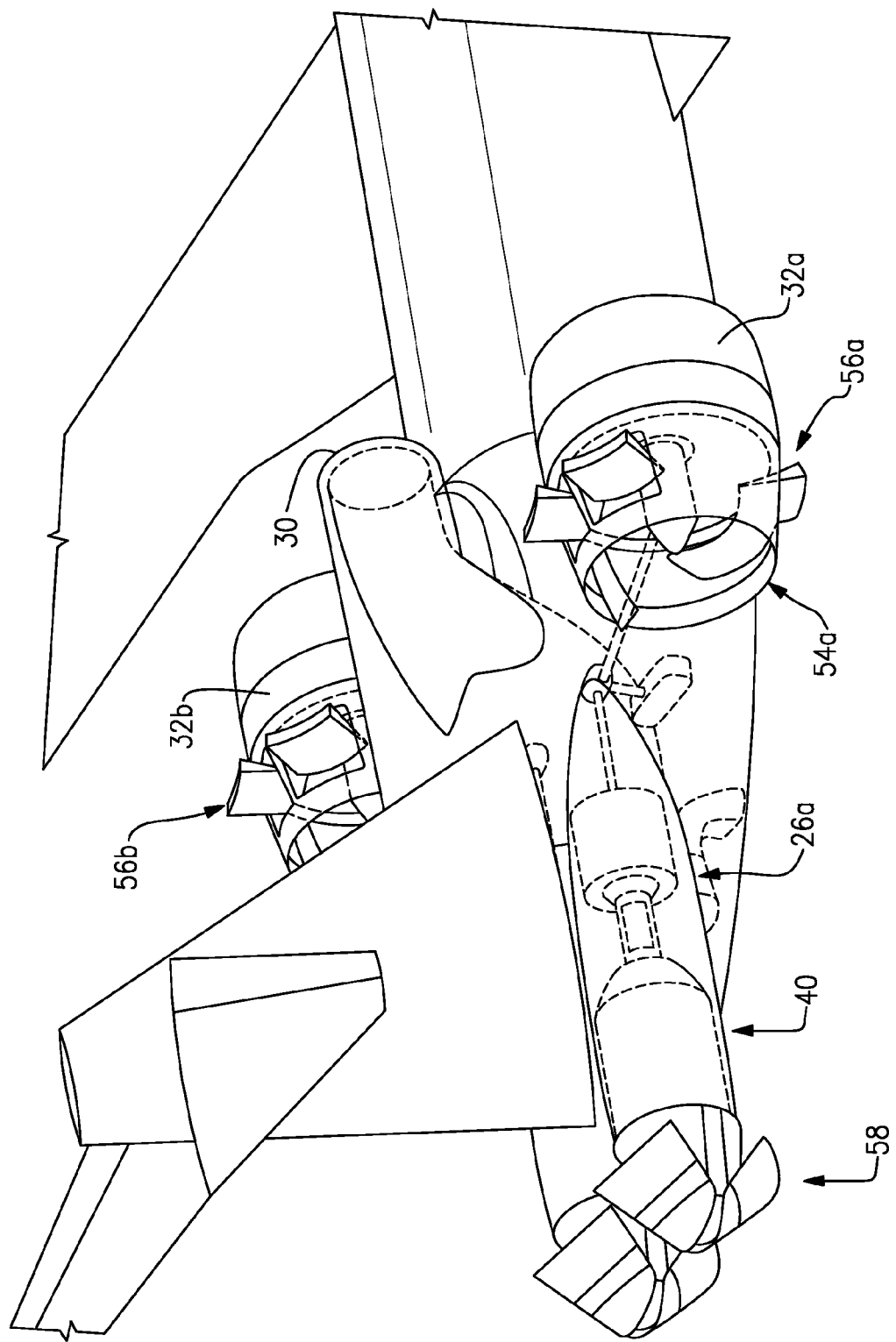
FIG. 7 is an example view of a thrust reverser of the example propulsion system.

Referring to FIG. 7, the example propulsion system 25 includes thrust reversing features. In this example, both the fan sections 28a and 28b include a thrust reverser 56a, 56b along with thrust reverser 58 mounted to the core engine sections 26a and 26b. In operation, the fan sections 28a and 28b both include the corresponding thrust reversers 56a, 56b that include doors that open radially outward to direct thrust outwardly to slow the aircraft 10.

The propulsion system 25 also includes thrust reversing doors on a nozzle 40 corresponding to the core engines 26a and 26b. The thrust reversing portion 58 includes doors that close along a center line of each of the core engines 26a and 26b. Thrust generated by the core engines 26a and 26b is thereby directed in a manner to slow the aircraft once it has landed.

The aft fuselage mounting of the core engine sections 26a and 26b eliminates requirements for heavier and more robust engine mounting structures that would be required for traditional wing and fuselage mounted turbofan engines. Moreover, the coupling of the core engine sections 26a and 26b from the corresponding fan sections 28a and 28b allows for a more efficient and smaller fan support structures. Furthermore, a fuselage mounting of the fan sections 28a and 28b along with the core engine sections 26a and 26b does not require extending or raising the aircraft 10 by providing longer landing gear structures.

Accordingly, the example aircraft and propulsion system disclosed for the example aircraft provides for the use of an ultra-high bypass fan section in commercial aircraft without limit to the fan diameter or without the requirement for heavy mounting structures to support core engine and fan components.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
   a core engine section mounted within an aft portion of an aircraft fuselage, the core engine section including a compressor section feeding air to a combustor to generate high speed exhaust gases that drive a turbine section all disposed about an engine axis;
   a geartrain mounted within the aircraft fuselage and driven by the core engine section;
   a fan section externally mounted to the aircraft fuselage and driven by the geartrain about a fan axis spaced apart from the engine axis; and
   an accessory gearbox supported within the aircraft fuselage and driven by the geartrain and mounted apart from the core engine section and the fan section, the accessory gear box driving at least one system required for operation of the core engine section,
   wherein the core engine section comprises a first core engine section disposed about a first axis and a second core engine section disposed about a second axis different than the first axis, the first core engine section and the second core engine section mounted within the aft portion of the aircraft fuselage and the fan section comprises first and second fan sections driven by a corresponding one of the first and second core engine sections.

2. The aircraft propulsion system as recited in claim 1, including an inlet for supplying air to the core engine section mounted to the aircraft fuselage, the inlet defining a passageway supplying air separate from airflow through the fan section.

3. The aircraft propulsion system as recited in claim 1, including a fan case surrounding the fan section, the fan case including a thrust reverser movable to a position directing thrust from the fan section in a direction to slow the aircraft.

4. The aircraft propulsion system as recited in claim 1, including an exhaust nozzle disposed about the engine axis, the exhaust nozzle including a thrust reverser for directing exhaust gases from the core engine section in a direction to slow the aircraft.

5. The aircraft propulsion system as recited in claim 1, including an input shaft driven by the core engine section for driving the geartrain, a first output shaft from the geartrain driving the fan section, and a second output shaft from the geartrain driving the accessory gearbox.

6. The aircraft propulsion system as recited in claim 1, wherein the fan axis is parallel to the engine axis.

7. The aircraft propulsion system as recited in claim 1, wherein the geartrain comprises first and second geartrains and the accessory gearbox comprises first and second accessory gearboxes driven by a corresponding one of the first and second geartrains.

8. An aircraft system comprising:
   an elongated fuselage;
   a wing structure extending from opposing sides of the fuselage;
   a vertical stabilizer including a horizontal stabilizer surface mounted to an upper portion of the vertical stabilizer;
   a first core engine section and a second core engine section mounted within an aft portion of an aircraft fuselage, each of the first core engine section and the second core engine section including a compressor section feeding air to a combustor to generate high speed exhaust gases that drive a turbine section disposed about an corresponding first engine axis and second engine axis;
   a first geartrain and a second geartrain mounted within the aircraft fuselage and driven by a corresponding one of the first core section and the second core engine section;
   a first fan section and a second fan section externally mounted to the aircraft fuselage and driven by a corresponding one of the first geartrain and the second geartrain about a corresponding one of a first fan axis and a second fan axis spaced apart from a corresponding one of the first engine axis and the second engine axis; and
   an accessory gearbox supported within the aircraft fuselage and driven by at least one of the first geartrain and the second geartrain, the accessory gearbox mounted apart from the first core engine section, the second core engine section, the first fan section and the second fan section.

9. The aircraft system as recited in claim 8, including an air inlet supplying air to each of the first and second core engine sections, the air inlet defining a passage supplying air separate of air flow through any of the first fan section and the second fan section.

10. The aircraft system as recited in claim 8, wherein each of the first fan section and the second fan section are mounted above the wing structure.

11. The aircraft system as recited in claim 8, wherein each of the first fan section and the second fan section comprise a bypass ratio greater than about 10.

* * * * *